United States Patent [19]

Clifford

[11] 4,448,823

[45] May 15, 1984

[54] MULTI-COLORED LIQUID CRYSTAL DISPLAY DEVICE

[76] Inventor: Brad W. Clifford, 747 E. Main St., Hoopeston, Ill. 60942

[21] Appl. No.: 427,233

[22] Filed: Sep. 29, 1982

[51] Int. Cl.³ .................................... B32B 31/20
[52] U.S. Cl. ........................................... 428/1
[58] Field of Search .................... 428/1; 350/335, 337, 350/341

[56] References Cited

U.S. PATENT DOCUMENTS

| | | | |
|---|---|---|---|
| 3,886,014 | 5/1975 | Bayer | 428/1 |
| 4,025,688 | 5/1977 | Nagy et al. | |
| 4,048,358 | 9/1977 | Shanks | |
| 4,061,417 | 12/1977 | Katagiri | |
| 4,246,302 | 1/1981 | Benton et al. | |
| 4,256,787 | 3/1981 | Shaver et al. | |

OTHER PUBLICATIONS

Chilton's Product Design and Development, vol. 36, No. 9, p. 21, Sep. 1981.

Primary Examiner—Marion McCamish
Attorney, Agent, or Firm—Henderson & Sturm

[57] ABSTRACT

A multi-colored liquid crystal display device for selectively providing different colored segment displays against a contrasting background. The device includes layered color units. Each color unit includes either a standard liquid crystal display unit and a colored polarized filter, or a dichroic liquid crystal display unit.

7 Claims, 9 Drawing Figures

U.S. Patent   May 15, 1984   Sheet 1 of 2   4,448,823
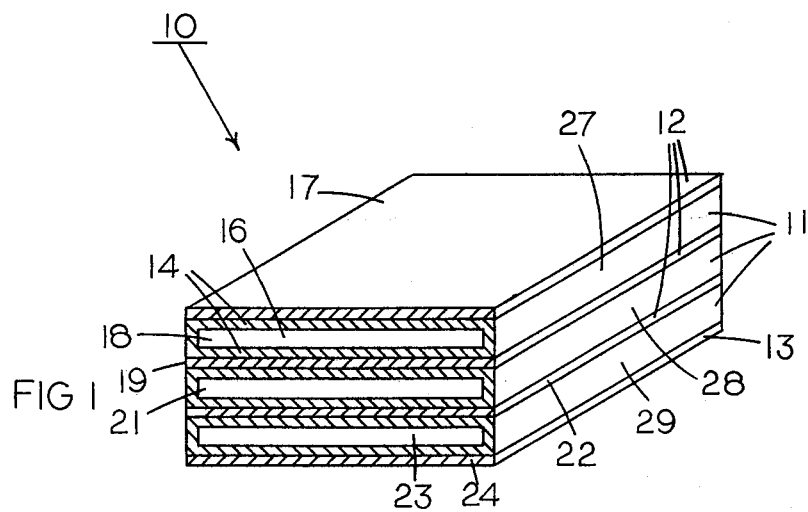
FIG 1
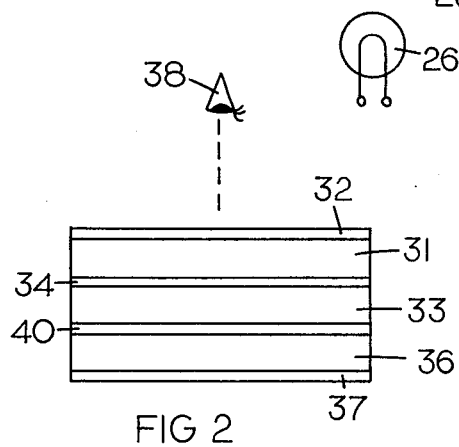
FIG 2
| COLOR UNIT | SEGMENT COLOR |
|---|---|
| 3 | GREEN |
| 1 | BLUE |
| 2 | WHITE |
| 3+2 | DULL VIOLET |
| 3+1 | VIOLET |
| 2+1 | RED |
| 1+2+3 | DULL GREEN |
VIOLET BACKGROUND
FIG 3
| COLOR UNIT | SEGMENT COLOR |
|---|---|
| 3 | DULL BLACK |
| 1 | VIOLET |
| 2 | BLUE |
| 3+2 | GREEN |
| 3+1 | BLACK |
| 2+1 | RED |
| 1+2+3 | DULL GREEN |
WHITE BACKGROUND
FIG 5
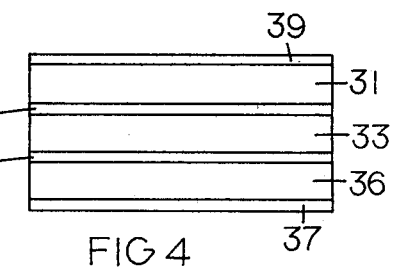
FIG 4

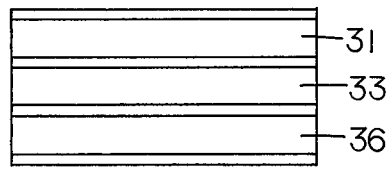
FIG 6
| COLOR UNIT | SEGMENT COLOR |
|---|---|
| 3 | DULL GREEN |
| 1 | VIOLET |
| 2 | BLUE |
| 3+2 | NEAR BLACK |
| 3+1 | GREEN |
| 2+1 | WHITE |
| 1+2+3 | NEAR BLACK |
RED BACKGROUND
FIG 7
| COLOR UNIT | SEGMENT COLOR |
|---|---|
| 3 | DULL RED |
| 1 | RED |
| 2 | VIOLET |
| 3+2 | DULL GREEN |
| 3+1 | GREEN |
| 2+1 | WHITE |
| 1+2+3 | NEAR BLACK |
BLUE BACKGROUND
FIG 9
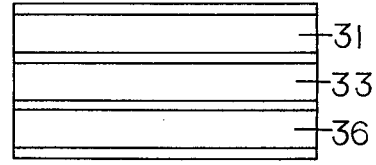
FIG 8

MULTI-COLORED LIQUID CRYSTAL DISPLAY DEVICE

TECHNICAL FIELD

This invention relates generally to liquid crystal display devices.

BACKGROUND ART

Liquid crystal materials are substances that exhibit some of the properties of solid crystals while in a liquid state over a particular temperature range that relate to its mesophasic state. Though liquid crystal materials have been known since at least 1889, it has only been recently that these materials have been used to create liquid crystal displays.

Liquid crystal displays are typically formed of flat panels of glass that are hermetically sealed with a layer of liquid crystal material between them. The inside surfaces of the glass plates each have a transparent conductive layer of material such as tin oxide sintered or baked onto the glass.

Though liquid crystals are comprised of three main types (smectic, nematic, and cholesteric), they are all characterized by molecules that are elongated and that are possessed of electrical dipole axes disposed at 90° to the main axes of the molecules. When subjected to an electric field, the orientation of these molecules can be reordered.

In use, the conductive material disposed on the inner surface of the glass plates will be formed in the shape of the desired segment display, such as an alphanumeric character or portion thereof. Upon energizing the opposing conductive materials, the molecular contents of the liquid crystal material may be electrically rearranged. This will cause the material located between the opposing conductive surfaces to appear to the eye as a color or shade distinguishable from the main body of liquid crystal materials, which comprises the background color.

Many such displays are known in the prior art. These displays have found considerable use in applications where low power requirements are important, or where low voltage, low current and low surface temperature and characteristics are necessary for safety. To date, such displays are typically comprised of a single color for the background and a single differing color or shade for the display characters.

Some prior art users have obtained color displays by introducing an appropriate dye material into the liquid crystal material itself, or by the use of colored filters. No one has yet provided a liquid crystal display unit that can selectively display the segment characters in a variety of different colors against an opposing background.

Such a liquid crystal display unit could have many possible uses. In addition to being useful in meters or gauges where a particular condition could be highlighted by changing the color of the display characters, such an arrangement could be used for a solid state television screen. Therefore, it would be desirable to provide a multi-colored liquid crystal display device wherein the color of the segment display characters could be selectively changed.

DISCLOSURE OF THE INVENTION

There are two primary ways to construct a liquid crystal display unit. The first mechanism usually presumes that the liquid crystal material will be of the nematic or smectic type. Such a material has molecules that will arrange themselves with their long axes parallel to one another but that may take up any position along their axes with respect to adjacent molecules. Such material in essence exhibits a molecular grain, but no layers are formed.

This material will be disposed in between two hermetically sealed substantially transparent plates that have conducting films disposed thereon. Upon energizing the conducting films, the molecules will be urged to rotate through 90° so that the dipole axes are brought into line with the resulting electric field.

When this happens, free negative and positive ions in the liquid are drawn to the appropriate oppositely charged conducting surface. When these ions pass through the liquid, they locally neutralize the electric field that would otherwise appear across the liquid between the opposing conductive surfaces. This will result in small groups of molecules becoming randomly disoriented. These randomly arranged groups of molecules will scatter light at their interfaces due to their anisotropic properties. As a result, the liquid between the conducting plates will appear in contrast to the background of the display.

The other form of liquid crystal display presumes the use of cholesteric liquid crystal material. This material has its molecules all oriented in the same direction in each layer of molecules, but each layer will be slightly twisted with respect to the layers above and below it.

As with the nematic liquid, the cholesteric liquid will be disposed between two hermetically sealed plates having a conducting substance formed on the inner surfaces thereof. In addition, however, a polarized filter will be placed on either side of the glass sandwich. Upon applying an electric potential across the conductive materials, the liquid crystal molecules will twist through 90°. As a result, light entering through one polarizing filter will not now be able to pass out through the remaining polarizing filter on the other side, and the area between the conductive surfaces will appear black to a viewer.

Since the cholesteric material forms display characters by the absence of light in a particular designated area, the applicant has determined that nematic or smectic liquid crystal materials are best suited for color purposes. Therefore, the remainder of this application will presume the use of nematic or smectic liquids.

The applicant has determined that a multi-colored liquid crystal display device may be formed by layering a plurality of liquid crystal display and color filter units, or by layering a plurality of dichroic colored liquid crystal display units, or by a combination of both. For example, such a device may be comprised of a first colored unit having a liquid crystal display attached to a red filter. A second color unit may be provided by utilizing a second liquid crystal display as connected to a blue filter. Finally, a third color unit may be provided by using a third liquid crystal display as attached to a green filter. These three color units may then be aligned with one another such that light passing through one must pass through all.

By selectively energizing one or more of the liquid crystal displays, display characters of varying colors can be produced. In addition, polarized filters or dichroic liquid crystal displays of varying colors may be used and oriented in juxtaposition to one another in order to produce other color results. Finally, the order in which the colored filters or dichroic liquid crystal display units appear in the layers may also be manipulated to vary the colors that may be selected for the display characters.

BRIEF DESCRIPTION OF THE DRAWINGS

These and other attributes of the invention should become more clear upon a careful review of the following disclosure of the best mode for carrying out the invention, especially when studied in conjunction with the drawings, wherein:

FIG. 1 is a perspective representation of the invention;

FIG. 2 is a block diagram of one embodiment of the invention;

FIG. 3 is a graph depicting the colors that may be obtained from the configuration depicted in FIG. 2;

FIG. 4 is a block diagram of a second embodiment of the invention;

FIG. 5 is a graph depicting the colors that may be obtained from the configuration depicted in FIG. 4;

FIG. 6 is a block diagram of a third embodiment of the invention;

FIG. 7 is a graph depicting the colors that may be obtained from the configuration depicted in FIG. 6;

FIG. 8 is a block diagram of a fourth embodiment of the invention; and

FIG. 9 is a graph depicting the colors that may be obtained from the configuration depicted in FIG. 8.

BEST MODE FOR CARRYING OUT THE INVENTION

Referring now to the drawings, and in particular to FIG. 1, the device may be seen as represented generally by the numeral 10. The device (10) includes generally a plurality of standard LCD units (11), a plurality of colored and polarized filters (12) and a backing layer (13). Each of these general components will now be described in detail.

Each liquid crystal display unit (11) includes two substantially transparent plates (14) that are hermetically sealed as well known in the prior art such that the two plates are disposed approximately one thousandth of an inch (0.0025 cm) from one another. A liquid crystal material is sandwiched between the two plates to entirely fill the space between the two plates (14).

The construction of such a standard liquid crystal display unit (11) is well known in the prior art and no detailed description of same need be presented here. It will suffice to note that the inside surfaces of the plates (14) have deposited on them a transparent conductive layer in the shape of a pattern which the operator desires to be able to display. Typically, this layer will be comprised of indium or tin oxide that has been sintered or baked onto the plate.

A row of contact areas along one or more edges of one or more of the plates may be arranged so that it can be inserted into a suitable matching contact socket(s). The line of conducting material may join the contact area at the edge of the display to the conductive pattern. Such lines must be laid out on one plate so as not to face any conducting area on the opposite plate. Only patterns to be displayed may have matching areas facing one another on opposing glass plates.

To summarize, each standard liquid crystal display unit (11) includes two plates (14) having a layer of liquid crystal material (16), possibly dichroic, sandwiched between them and hermetically sealed therebetween. The inner surfaces of the plates have transparent conducting material deposited thereon. During use, when an electric field is applied between the opposing conductive surfaces, the interaction between the resulting electric field and the liquid crystal material will result in a discernable display.

When dichroic liquid crystal display units are not used, a colored polarized filter (12) may be used. The colored polarized filters (12) are each comprised of a colored sheet that acts to polarize light passing therethrough.

The backing layer (13) may be either a reflective surface or a transflective material.

The combination of the above elements will now be described.

The device (10) may be formed by alternately layering standard liquid crystal display units (11) with colored polarized filters (12), by layering a plurality of dichroic liquid crystal display units, or by a combination of both. In the embodiment shown, the device (10) includes a top layer represented by a red colored polarized filter having its acceptance planes arranged vertically. The next layer includes a standard first liquid crystal display unit (11) that joins with the red polarized filter such that light passing through the red filter must also pass through the first liquid crystal display unit.

The next layer may be comprised of a blue polarized filter (19) having its acceptance planes oriented horizontally. The blue polarized filter (19) should be layered with the first liquid crystal display unit (18) such that light passing through the red filter (17) and the first liquid crystal display unit (18) must also pass through the blue filter (19).

The next layer may be comprised of a second liquid crystal display unit (21). Again, this unit (21) may be positioned with respect to the preceding layers (17, 18 and 19) such that light entering the previous layers must also pass through the second liquid crystal display unit (21).

The next layer may be comprised of a green polarized filter (22) having its acceptance planes oriented vertically.

Once again, the green filter (22) should be positioned with respect to the preceding layers that light passing through the previous layers must also pass through the green filter (22). The next layer may be a third liquid crystal display unit (23) so positioned with respect to the preceding layers that light passing through the preceding layers must also pass through the third liquid crystal display unit (23).

Finally, the last layer depicted comprises the backing layer (24). This backing layer (24) may be either a reflective backing or a transflective backing. If reflective, then light entering the preceding layers will pass through the layers until it strikes the reflective backing layer (24). The light will then be reflected back through the various layers until it exits through the red polarized filter (17).

If the backing layer includes transflective material, operation will be somewhat different. In this case, light passing through the preceding layers will again be reflected off the transflective layer (24) and exit through the red polarized filter (17). In addition, however, light may be caused to enter into the various layers by placing a light (26) source underneath the transflective layer (24). So disposed, the light will enter through the transflective layer and pass through the various layers until it also exits through the red polarized filter (17).

It will assist in understanding the invention if the red polarized filter and first liquid crystal display unit (18) are considered a first color unit (27), the blue polarized filter (19) and the second liquid crystal display unit (21) are considered a second color unit (28), and the green polarized filter (22) and the third liquid crystal display unit (23) are considered a third color unit (29). It should also be understood that the first color unit (27) could be comprised instead of a red colored dichroic liquid crystal display unit, the second color unit (28) could be comprised of a blue colored dichroic liquid crystal display unit, and the third color unit (29) could be comprised of a green colored dichroic liquid crystal display unit. As shown below, the orientation of the polarized acceptance planes for each color unit, the color of the filter for each color unit, and the respective position of each color unit will each have an effect with respect to the resulting colored display.

Operation of the device (10) will now be described with respect to FIGS. 2 through 9.

In FIG. 2, the uppermost color unit (31) has a red polarized filter (32) disposed such that its acceptance planes are horizontally oriented. The next color unit (33) has a blue filter (34) having its acceptance planes disposed vertically. The last color unit has a green filter (37) disposed such that its acceptance planes are also vertically oriented. Finally, a reflective backing layer (40) has been provided.

If the operator energizes the conductive surfaces associated with the standard liquid crystal display unit associated with the first color unit (31), then the device (10) will display a blue segment color against a violet background. If the operator energizes only the conductive plates associated with the second color unit (33), then the device (10) will display a white colored segment against a violet background. If the operator energizes only the third color unit (36), then an observer will view a green segment color against a violet background.

If the operator energizes the conductive surfaces of the standard liquid crystal display units associated with both the first and second color units (31 and 33), then an observer (38) will observe a red segment color against a violet background. If the first and third color units (31 and 36) are energized, then an observer will view a violet segment color against a violet background. If the second and third color units (33 and 36) only are energized, then an observer will see a dull violet segment color against a violet background. Finally, if all three color units (31, 33 and 36) are energized, then an observer will view a dull green segment color against a violet background.

These results are presented in graph form in FIG. 3, where the column labeled "color unit" indicates which color units are energized and the column labeled "segment color" indicates the color of the segment that will be resultant for that combination of color units. Finally, the background color for all combinations is indicated beneath the graph.

Referring now to FIG. 4, another embodiment of the device (10) will be disclosed.

Here, the first color unit (31) includes a blue polarized filter (39) having its acceptance planes oriented vertically. The second color unit (33) has a red filter (41) having its acceptance plane oriented horizontally. The third color unit (36) has a green filter (42) having its acceptance planes oriented vertically. Finally, a reflective layer (37) connects to the bottom of the third color unit (36).

Referring now to FIG. 5, it may be seen that the embodiment depicted in FIG. 4 yields a white background. If only the first color unit (31) is energized, the segment color will be blue. If only the second color unit (33) is energized, the segment will be violet. If only the third color unit (36) is energized, then the segment color will appear dull black.

If both the first and second color units (31 and 33) are energized, then the segments will appear red. If the first and third color units (31 and 36) are energized, then the segments will appear black. If the second and third color units (33 and 36) only are energized, then the segment will appear green. Finally, if all three color units (31, 33 and 36) are energized, then the segments will appear dull green.

It will be observed upon comparing the results between the embodiment shown in FIG. 2 and the embodiment shown in FIG. 4 that the color of the background and the color of segments may be altered by simply rearranging the order in which the color units appear in the layer. It should be noted that the acceptance planes of the various filters have not been altered as between the two embodiments. The only difference between the two embodiments are that the first color unit (31) in FIG. 2 has been juxtaposed with the second color unit (33) of that same embodiment to yield the embodiment shown in FIG. 4.

Referring now to FIG. 6, the color units are arranged in the same order as the embodiment shown in FIG. 4. That is, the first color unit (31) has a blue filter, the second color unit (33) has a red filter, and the third color unit (36) has a green filter.

Also, the blue filter and green filter shown in FIG. 6 have their acceptance planes oriented as depicted in FIG. 4. The only difference between the embodiment shown in FIG. 6 and FIG. 4, then, is that the red filter in FIG. 6 has its acceptance planes oriented vertically, whereas, in the embodiment shown in FIG. 4 the acceptance planes are oriented horizontally.

Referring now to FIG. 7, the embodiment depicted in FIG. 6 yields a red background. With only the first color unit (31) energized, the segment color will be violet. With only the second color unit (33) energized, the segment color will be blue. With only the third color unit (36) energized, the segment color will be dull green.

With both the first and second color units (31 and 33) energized, the segment color will be white. With both the first and third color units (31 and 36) energized, the segment color will be green. With both the second and third color units (33 and 36) energized, the segment color will be nearly black. Finally, with all three color units (31, 33 and 36) the segment color will again be nearly black.

Just as the embodiment depicted in FIG. 6 differs from the embodiment depicted in FIG. 4 only in that red filter has been realigned to dispose its acceptance planes vertically, the embodiment in FIG. 8 differs from the embodiment depicted in FIG. 2 by again having the red filter realigned to place its acceptance planes vertically.

So oriented, and upon referring to FIG. 9, the observer will view the various colored segments against a blue background. With only the first color unit (31) energized, segment color will be violet. With only the second color unit (33) energized, the segment color will be red. With only the third color unit (36) energized, the segment color will be dull red.

With both the first and second color units (31 and 33) energized, the segment color will be white. With only the first and third color units (31 and 36) energized, the segment will appear green. With only the second and third color units (33 and 36) energized, the segments will appear dull green. Finally, with all three color units (31, 33 and 36) energized, the segments will appear to be nearly black.

Similar results can be obtained by using dichroic liquid crystal display units rather than the combined liquid crystal display and filter units. It will therefore be observed that by layering color units as described, a variety of multi-colored liquid crystal displays may be obtained by selectively energizing various combinations of the same color units. By varying the order in which the colored filters are layered, or by varying the orientation of the acceptance planes of the polarized filters, a variety of different colored backgrounds and segment colors may be obtained. Furthermore, it should be clear that additional or fewer color units could be added to or subtracted from the combination to provide additional or fewer layers, and that other colored filters could be utilized as well.

Having hereby disclosed the subject matter of this invention, it should be obvious that many modifications, substitutions, and variations of the invention are possible in light of the above teachings. It is therefore to be understood that the invention may be practised other than as specifically described and should be limited only by the breadth and scope of the appended claims.

I claim:

1. A multi-colored liquid crystal display device comprising at least three color units, said color units comprising:
   (a) first liquid crystal display and filter means comprising a first liquid crystal display unit operably connected to a first colored filter for providing a first color unit;
   (b) second liquid crystal display and filter means comprising a second liquid crystal display unit operably connected to a second colored filter for providing a second color unit; and
   (c) third liquid crystal display and filter means comprising a third liquid crystal display unit operably connected to a third color filter for providing a third color unit and being disposed between said first and second liquid crystal display and filter means; said color units being operably disposed proximal to one another and aligned with one another such that at least some of any light that passes through one of said color units will also pass through all remaining said color units; whereby different colored displays may be selectively displayed by selectively energizing one or more of said first, second and third liquid crystal display units.

2. The device of claim 1 and further including a reflective surface disposed proximal said second color unit such that at least some of any light that passes through said first colored filter and said first liquid crystal display and filter means and through said second and third color units will be reflected back through said third, second and first color unit.

3. The device of claim 1 and further including a transflective surface disposed proximal said second color unit such that at least some of any light that passes through said first, second and third color unit will be reflected back through said third, second and first color unit, and such that at least some of any light that enters said third color unit through said transflective surface will also pass through said second and first color units.

4. The device of claim 1 wherein said first, second and third colored filters are polarized.

5. The device of claim 1 or claim 5 wherein said first, second and third colored filters are each of a color different from the other two filters.

6. The device of claim 1 wherein each said color unit is formed of a dichroic liquid crystal display unit, whereby different colored displays may be selectively displayed by selectively energizing one or more of said dichroic liquid crystal display units.

7. The device of claim 1 wherein at least one of said color units is comprised of a dichroic liquid crystal display unit, and at least one of said color units is comprised of a combined non-dichroic liquid crystal display unit and filter unit.

* * * * *